United States Patent
Byun et al.

(10) Patent No.: US 11,767,437 B2
(45) Date of Patent: Sep. 26, 2023

(54) POROUS POLYMER ACTUATOR AND METHOD FOR FABRICATING THE SAME

(71) Applicant: KOREA INSTITUTE OF SCIENCE AND TECHNOLOGY, Seoul (KR)

(72) Inventors: Jee Hye Byun, Seoul (KR); Seong Pil Jeong, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 301 days.

(21) Appl. No.: 17/234,800

(22) Filed: Apr. 20, 2021

(65) Prior Publication Data

US 2022/0154012 A1 May 19, 2022

(30) Foreign Application Priority Data

Nov. 19, 2020 (KR) .................. 10-2020-0155763

(51) Int. Cl.
*C09D 5/24* (2006.01)
*B05D 1/00* (2006.01)
(Continued)

(52) U.S. Cl.
CPC ............... *C09D 5/24* (2013.01); *B05D 1/60* (2013.01); *C08J 7/044* (2020.01); *C08J 7/0427* (2020.01);
(Continued)

(58) Field of Classification Search
CPC .. C08G 61/123; C08G 61/124; C08G 61/125; C08G 61/126; C08L 65/00; C09D 5/24; C09D 165/00
See application file for complete search history.

(56) References Cited

U.S. PATENT DOCUMENTS

2015/0029641 A1* 1/2015 Han .................. C08G 73/0611
526/256

FOREIGN PATENT DOCUMENTS

JP 4-275078 A 9/1992
JP 2004-98199 A 4/2004
(Continued)

OTHER PUBLICATIONS

Machine Translation of JP 2011/205751 (Year: 2011).*
(Continued)

*Primary Examiner* — Zachary M Davis
(74) *Attorney, Agent, or Firm* — CANTOR COLBURN LLP

(57) ABSTRACT

The present disclosure relates to a porous polymer actuator which maintains the porous structure of the polymer actuator by forming a conductive polymer layer on a commercially available porous polymer separation membrane by vapor-phase polymerization and is capable of improving fast responsiveness to organic solvents and durability by ensuring structural anisotropy, and a method for fabricating the same. The porous polymer actuator according to the present disclosure includes: a porous polymer separation membrane having pores; and a conductive polymer layer coated on one surface and in the pores of the porous polymer separation membrane, wherein the porous polymer actuator has a gradient wherein the amount of the conductive polymer coated in the pores decreases from the one surface of the porous polymer separation membrane toward the other surface.

20 Claims, 14 Drawing Sheets

(51) Int. Cl.
  *C09D 165/00* (2006.01)
  *C08J 7/04* (2020.01)
  *C08J 7/044* (2020.01)
  *H01B 5/14* (2006.01)
  *H01B 3/30* (2006.01)
  *H01B 3/44* (2006.01)

(52) U.S. Cl.
  CPC ............ *C09D 165/00* (2013.01); *H01B 5/14* (2013.01); *C08J 2327/16* (2013.01); *C08J 2369/00* (2013.01); *C08J 2377/06* (2013.01); *C08J 2379/08* (2013.01); *C08J 2465/00* (2013.01); *H01B 3/306* (2013.01); *H01B 3/445* (2013.01)

(56) References Cited

FOREIGN PATENT DOCUMENTS

| JP | 2011205751 A | * | 10/2011 |
| KR | 10-1219579 B1 | | 1/2013 |
| KR | 10-2014-0047922 A | | 4/2014 |
| KR | 10-2015-0022474 A | | 3/2015 |
| KR | 10-1603772 B1 | | 3/2016 |
| KR | 10-2020-0052597 A | | 5/2020 |

OTHER PUBLICATIONS

Lidong Zhang et al., "Vapomechanically Responsive Motion of Microchannel-Programmed Actuators," Advanced Materials, 2017, 8 pages, vol. 29, No. 1702231.

Taoping Wang et al., "A multi-responsive bidirectional bending actuator based on polypyrrole and agar nanocomposites," Journal of Materials Chemistry C, 2018, pp. 6416-6422, vol. 6, The Royal Society of Chemistry.

Yuxia Jin et al., "Superfast, Porous, and Organic Solvent-Sensitive Actuator Based on EVOH Nanofibrous Membrane and PS Microspheres," The Journal of Physical Chemistry C, 2019, pp. 185-194, vol. 123, American Chemical Society.

Amber M. Hubbard et al., "Hydrogel/Elastomer Laminates Bonded via Fabric Interphases for Stimuli-Responsive Actuators," MATTER, 2019, pp. 674-689, Elsevier Inc.

Qiang Zhao et al., "An instant multi-responsive porous polymer actuator driven by solvent molecule sorption," Nature Communications, Jul. 1, 2014, 8 pages, vol. 5, No. 4293.

* cited by examiner

POROUS POLYMER ACTUATOR AND METHOD FOR FABRICATING THE SAME

CROSS-REFERENCE TO RELATED APPLICATION

This application claims the priority of Korean Patent Application No. 10-2020-0155763 filed on Nov. 19, 2020, and all the benefits accruing therefrom under U.S.C. § 119, the contents of which in its entirety are herein incorporated by reference.

TECHNICAL FIELD

The present disclosure relates to a porous polymer actuator and a method for fabricating the same. More particularly, it relates to a porous polymer actuator which maintains the porous structure of the polymer actuator by forming a conductive polymer layer on a commercially available porous polymer separation membrane by vapor-phase polymerization and is capable of improving fast responsiveness to organic solvents and durability by ensuring structural anisotropy, and a method for fabricating the same.

BACKGROUND ART

A soft actuator which exhibits reversible shape change characteristics in response to change in heat, light, pH, humidity, etc. is applicable to various fields. The soft actuator mimics the shape change of animals and plants in response to external stimuli and its application to various fields such as energy harvesting, drug delivery, soft robotics, etc. is being sought. Fast responsiveness, durability and controllability are required for the soft actuator.

Among soft actuators, actuators driven in response to organic solvents, so-called organic solvent-driven actuators, exhibit reversible and rapid shape change upon contact with organic solvents. Due to this characteristic, they are applicable as sensors and grippers etc. in chemical leakage situation.

Polymer or polymer/carbon composite structures have been proposed as organic solvent-driven actuators. Particularly, polymer actuators are known to allow control of operation speed, shape change and movement direction by adjusting chemical structure and composition at molecular levels.

It is known that a polymer actuator can be fabricated by providing structural anisotropy into a polymer film. For example, after preparing a polymer actuator with a double-layer or multiple-layer polymer film, shape change may be induced through different volume expansion in the respective layers. Recently, polymer actuators with PVDF/polyvinyl alcohol, polypyrrole (PPy)/agar, poly(vinyl alcohol-co-ethylene)/polystyrene, polydimethylsiloxane/polyampholyte and poly(acrylic acid)-block-poly(n-butyl methacrylate) structures have been proposed.

However, the polymer actuator with a double-layer or multiple-layer structure is disadvantageous in that fine structure control is required to induce fast responsiveness and large curvature change. In addition, there is a problem that performance may be degraded after long-term use due to exfoliation of layers.

Because of these problems, a single-layer polymer actuator has been proposed recently. The single-layer polymer actuator is advantageous in that thickness control is relatively easy and durability is superior because there is no problem of interlayer exfoliation. Although some single-layer polymer actuators having a porous structure, which allows good absorption of organic solvents and thus has improved responsiveness, have been fabricated, these actuators have the problems that their components are expensive and it is difficult to achieve a large-scale production because the process of preparing pores in the single layer is complicated.

DISCLOSURE

Technical Problem

The present disclosure is directed to providing a porous polymer actuator which maintains the porous structure of the polymer actuator by forming a conductive polymer layer on a commercially available porous polymer separation membrane by vapor-phase polymerization and is capable of improving fast responsiveness to organic solvents and durability by ensuring structural anisotropy, and a method for fabricating the same.

Technical Solution

A porous polymer actuator according to the present disclosure includes: a porous polymer separation membrane having pores; and a conductive polymer layer coated on one surface and in the pores of the porous polymer separation membrane, wherein the porous polymer actuator has a gradient wherein the amount of the conductive polymer coated in the pores (i.e. pore walls) decreases from the one surface of the porous polymer separation membrane toward the other surface.

Due to the gradient wherein the amount of the conductive polymer coated in the pores (i.e. pore walls) decreases from the one surface of the porous polymer separation membrane toward the other surface, the porous polymer actuator has a gradient wherein volume expansivity decreases from the one surface of the porous polymer separation membrane toward the other surface upon contact of the porous polymer actuator with an organic solvent.

The organic solvent is a liquid organic solvent or an organic solvent vapor.

A conductive polymer is coated partly also on the other surface of the porous polymer separation membrane, and the porous polymer actuator has a gradient wherein the content of a specific element contained in the conductive polymer decreases from the one surface of the porous polymer separation membrane toward the other surface.

If the conductive polymer is polypyrrole or poly(3-heptylpyrrole) (P3HP), the porous polymer actuator has a gradient wherein the content of nitrogen (N) contained in the conductive polymer decreases from the one surface of the porous polymer separation membrane toward the other surface.

If the conductive polymer is any of poly(3,4-ethylenedioxythiophene) (PEDOT), poly(3-hexylthiophene) (P3HT) and polythiophene, the porous polymer actuator has a gradient wherein the content of sulfur (S) contained in the conductive polymer decreases from the one surface of the porous polymer separation membrane toward the other surface.

If the conductive polymer is polyfuran, the porous polymer actuator has a gradient wherein the content of oxygen (O) contained in the conductive polymer decreases from the one surface of the porous polymer separation membrane toward the other surface.

If the conductive polymer is polypyrrole, the porous polymer actuator has a gradient wherein the content of nitrogen (N) contained in the conductive polymer decreases from the one surface of the porous polymer separation membrane toward the other surface, and the difference in nitrogen content between the one surface and the other surface of the porous polymer separation membrane is 2% or greater. In addition, if the conductive polymer is polypyrrole, the porous polymer actuator has a gradient wherein the content of nitrogen (N) contained in the conductive polymer decreases from the one surface of the porous polymer separation membrane toward the other surface, and the difference in nitrogen content between the one surface and the other surface of the porous polymer separation membrane is 2-7.5%.

The porous polymer separation membrane is made of any of polyvinylidene fluoride (PVDF), polycarbonate (PC), polyimide (PI), nylon and fluorodyne.

The conductive polymer is any of polypyrrole (PPy), poly(3,4-ethylenedioxythiophene) (PEDOT), poly(3-hexylthiophene) (P3HT), poly(3-heptylpyrrole) (P3HP), polythiophene, and polyfuran.

A method for fabricating a porous polymer actuator according to the present disclosure includes: a step of preparing a porous polymer separation membrane having pores; a step of forming an oxidizing agent for vapor-phase polymerization on one surface of the porous polymer separation membrane; and a step of forming a conductive polymer layer on the one surface and in the pores of the porous polymer separation membrane through vapor-phase polymerization, wherein the porous polymer actuator has a gradient wherein the amount of the conductive polymer coated in the pores (i.e. pore walls) decreases from the one surface of the porous polymer separation membrane toward the other surface.

In the step of forming the conductive polymer layer on the one surface and in the pores of the porous polymer separation membrane through vapor-phase polymerization, the conductive polymer formed by vapor-phase polymerization is coated in the pores (i.e. pore walls) of the porous polymer separation membrane by diffusion of monomers and also is partly coated on the other surface of the porous polymer separation membrane, and the porous polymer actuator has a gradient wherein the content of a specific element comprised in the conductive polymer decreases from the one surface of the porous polymer separation membrane toward the other surface.

If the conductive polymer is polypyrrole or poly(3-heptylpyrrole) (P3HP), the porous polymer actuator has a gradient wherein the content of nitrogen (N) contained in the conductive polymer decreases from the one surface of the porous polymer separation membrane toward the other surface.

If the conductive polymer is any of poly(3,4-ethylenedioxythiophene) (PEDOT), poly(3-hexylthiophene) (P3HT) and polythiophene, the porous polymer actuator has a gradient wherein the content of sulfur (S) contained in the conductive polymer decreases from the one surface of the porous polymer separation membrane toward the other surface.

If the conductive polymer is polyfuran, the porous polymer actuator has a gradient wherein the content of oxygen (O) contained in the conductive polymer decreases from the one surface of the porous polymer separation membrane toward the other surface.

If the conductive polymer is polypyrrole, the porous polymer actuator has a gradient wherein the content of nitrogen (N) contained in the conductive polymer decreases from the one surface of the porous polymer separation membrane toward the other surface, and the difference in nitrogen content between the one surface and the other surface of the porous polymer separation membrane is 2% or greater. In addition, if the conductive polymer is polypyrrole, the porous polymer actuator has a gradient wherein the content of nitrogen (N) contained in the conductive polymer decreases from the one surface of the porous polymer separation membrane toward the other surface, and the difference in nitrogen content between the one surface and the other surface of the porous polymer separation membrane is 2-7.5%.

The step of forming the conductive polymer layer on the one surface and in the pores of the porous polymer separation membrane through vapor-phase polymerization includes: a process wherein the porous polymer separation membrane coated with the oxidizing agent is provided in a chamber for vapor-phase polymerization, a process wherein a monomer solution is added dropwise on a region of the chamber where the porous polymer separation membrane is not located, and a process wherein the added monomer solution is vaporized and the monomer is polymerized into a conductive polymer by the oxidizing agent for vapor-phase polymerization by diffusion through the one surface of the porous polymer separation membrane.

The monomer is any of pyrrole, 3,4-ethylenedioxythiophene (EDOT), 3-hexylthiophene (3HT), 3-heptylpyrrole (3HP), thiophene, and furan, and the conductive polymer is any of polypyrrole (PPy), poly(3,4-ethylenedioxythiophene) (PEDOT), poly(3-hexylthiophene) (P3HT), poly(3-heptylpyrrole) (P3HP), polythiophene, and polyfuran.

The step of forming the oxidizing agent for vapor-phase polymerization on the one surface of the porous polymer separation membrane includes: a process wherein an oxidizing agent solution for vapor-phase polymerization is coated on the one surface of the porous polymer separation membrane, and a process wherein the porous polymer separation membrane coated with the oxidizing agent solution for vapor-phase polymerization is dried.

The oxidizing agent for vapor-phase polymerization is a trivalent iron salt or ammonium peroxydisulfate.

When the oxidizing agent for vapor-phase polymerization is a trivalent iron salt, the oxidizing agent solution for vapor-phase polymerization is a solution containing any of iron(III) chloride hexahydrate, iron(III) nitrate nonahydrate, iron(III) sulfate hydrate, and iron(III) p-toluenesulfonate hexahydrate.

A solute content of the oxidizing agent solution for vapor-phase polymerization is 10-70 wt %. In addition, 10-50 μL of the oxidizing agent solution for vapor-phase polymerization may be coated per unit area ($cm^2$) of the porous polymer separation membrane.

The method includes, prior to the step of forming the conductive polymer layer on the one surface and in the pores of the porous polymer separation membrane through vapor-phase polymerization, a step of forming a mask on a portion of the one surface of the porous polymer separation membrane with the oxidizing agent for vapor-phase polymerization formed, wherein the conductive polymer layer is formed on the remaining region except the region on which the mask has been placed.

The mask may be formed by adding water drops dropwise or providing a tape on the portion.

Advantageous Effects

A porous polymer actuator according to the present disclosure and a method for fabricating the same provide the following effects.

By forming a conductive polymer layer on a porous polymer separation membrane through vapor-phase polymerization, a gradient of the amount of the conductive polymer coated in the pores (i.e. pore walls) of the porous polymer separation membrane may be formed along the depth direction of the separation membrane. Through this, structural anisotropy may be provided to the porous polymer actuator.

In addition, fast responsiveness to organic solvents may be achieved since structural anisotropy is provided by the gradient of the coating amount of the conductive polymer coated in the pores (i.e. pore walls) of the porous polymer separation membrane.

Furthermore, the advantage of a single-layered polymer actuator may be realized since the conductive polymer layer is coated in the pores (i.e. pore walls) of the porous polymer separation membrane and, through this, the advantageous durability of the single-layer polymer actuator may be achieved without interlayer exfoliation.

BEST MODE

Figure 1:
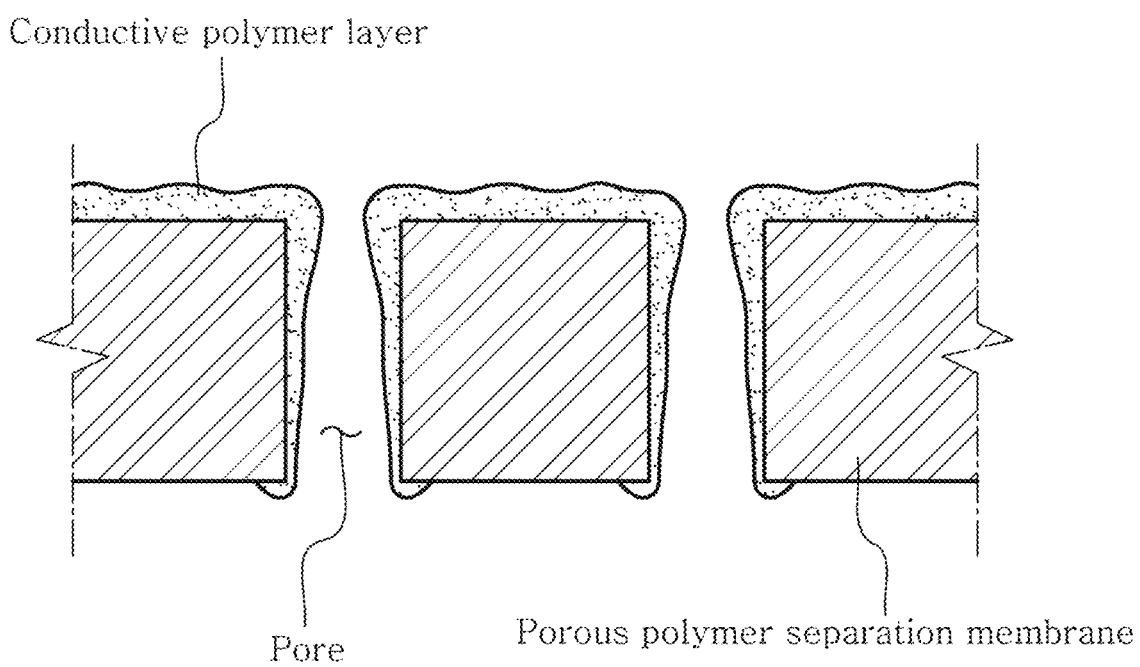
FIG. 1 is a schematic diagram of a porous polymer actuator according to an exemplary embodiment of the present disclosure.

The present disclosure provides a technology about a polymer actuator having fast responsiveness to organic solvents and superior durability.

It is difficult to achieve the durability of a polymer actuator and the responsiveness of the polymer actuator to organic solvents at the same time. As mentioned above in the 'Background Art' section, a polymer actuator having a double-layer or multiple-layer structure has the problem of interlayer exfoliation, etc. with time although responsiveness to organic solvents can be improved though different volume expansions of the respective layers. Meanwhile, a single-layer polymer actuator has the problem that it is difficult to achieve structural anisotropy although durability can be improved due to the absence of the interlayer exfoliation problem.

In a polymer actuator, 'structural anisotropy' refers to the gradient of volume expansivity between one surface and the other surface of the polymer actuator. The process whereby the polymer actuator undergoes reversible shape change in response to an organic solvent is a process wherein the shape change of the polymer actuator is induced due to the change in volume expansivity between one surface and the other surface of the polymer actuator as the organic solvent molecules pass from the one side to the other surface of the polymer actuator. Accordingly, the responsiveness to an organic solvent is improved as the structural anisotropy of the polymer actuator is greater.

As described, the gradient of volume expansivity should be achieved between one surface and the other surface of a polymer actuator in order to attain the structural anisotropy of the actuator. As described above, whereas structural anisotropy can be achieved easily with polymer films having different volume expansivities for a double-layer (or multiple-layer) actuator, although, it is not easy to achieve the structural anisotropy for a single-layer actuator within a single layer of a polymer.

For the single-layer polymer actuator, it is possible to achieve structural anisotropy through porous structure. The Q. Zhao et al. (*Nat. Commun.* 2014, 5, 4293) presents a technology of achieving structural anisotropy by inducing pore formation during the polymerization of an ionic liquid. However, the method according to the Q. Zhao et al. has a drawback of sophisticated preparation process to make a fine porous structure across the cross-section of the film. In addition, although Korean Patent Registration No. 1603772 presents a PVDF-based polymer actuator, it does not have structural anisotropy.

The present disclosure provides a technology whereby structural anisotropy can be provided to a polymer actuator via a simple process. A polymer actuator having structural anisotropy of a porous structure can be embodied by forming a conductive polymer layer on a porous polymer separation membrane via a vapor-phase polymerization process. The conductive polymer formed by vapor-phase polymerization is deposited on the porous polymer separation membrane and, at the same time, infiltrated into the pores of the porous polymer separation membrane.

As the conductive polymer is deposited on one surface of the porous polymer separation membrane by vapor-phase polymerization, a gradient of the coating amount of the conductive polymer in the pores (i.e. pore walls) of the porous polymer separation membrane is formed along the depth of the porous polymer separation membrane. Owing to the gradient of the coating amount of the conductive polymer, the structural anisotropy of the polymer actuator can be achieved. On the one surface of the porous polymer separation membrane on which the conductive polymer is deposited by vapor-phase polymerization, a gradient is formed wherein the coating amount of the conductive polymer coated in the pores (i.e. pore walls) of the porous polymer separation membrane decreases from the one surface of the porous polymer separation membrane toward the other surface.

The structural anisotropy of a polymer actuator can be achieved easily using the above-described method and, as demonstrated from the following experimental results, fast responsiveness to organic solvents can be achieved.

In addition, because the conductive polymer is coated in the pores (i.e. pore walls) of the porous polymer separation membrane, a single-layered polymer actuator wherein the porous polymer separation membrane is integrated with the conductive polymer layer can be obtained and, therefore, the durability of the single-layer polymer actuator can also be achieved.

Hereinafter, a porous polymer actuator according to an exemplary embodiment of the present disclosure and a method for fabricating the same are described referring to the attached drawings.

Referring to FIG. 1, a porous polymer actuator according to an exemplary embodiment of the present disclosure consists of a porous polymer separation membrane and a conductive polymer layer formed on one surface of the porous polymer separation membrane.

The porous polymer separation membrane is a polymer separation membrane having a plurality of pores, and the polymer separation membrane may be made of, for example, any of polyvinylidene fluoride (PVDF), polycarbonate (PC), polyimide (PI), nylon, and fluorodyne, although not being limited thereto. In addition, the porous polymer separation membrane may be a hydrophilic or hydrophobic porous polymer separation membrane because the surface property is not limited. As the porous polymer separation membrane, a commercially available porous polymer separation membrane may also be used.

And, the conductive polymer may be, for example, any of polypyrrole (PPy), poly(3,4-ethylenedioxythiophene) (PEDOT), poly(3-hexylthiophene) (P3HT), poly(3-heptylpyrrole) (P3HP), polythiophene, and polyfuran, although not being limited thereto.

The conductive polymer layer formed on the one surface of the porous polymer separation membrane may also be infiltrated into the pores of the porous polymer separation membrane.

The conductive polymer layer infiltrated into the pores of the porous polymer separation membrane has a gradient of coating amount between the one surface and the other surface of the porous polymer separation membrane. That is to say, a gradient wherein the amount of the conductive polymer coated in the pores (i.e. pore walls) decreases from the one surface of the porous polymer separation membrane toward the other surface of the porous polymer separation membrane is formed.

The gradient of the coating amount of the conductive polymer coated in the pores (i.e. pore walls) of the porous polymer separation membrane along the depth direction provides structural anisotropy to the polymer actuator.

Since the coating amount of the conductive polymer coated in the pores (i.e. pore walls) of the porous polymer separation membrane decreases from the one surface of the porous polymer separation membrane toward the other surface, difference in volume expansion occurs between the one surface and the other surface of the porous polymer separation membrane upon contact with an organic solvent. This allows reversible shape change in response to the organic solvent.

As described later, the gradient of the coating amount of the conductive polymer coated in the pores (i.e. pore walls) of the porous polymer separation membrane along the depth direction is formed by a vapor-phase polymerization process of the conductive polymer. In order to ensure fast responsiveness of the polymer actuator to organic solvents, there should be some difference in the amount of the conductive polymer coated on the one surface of the porous polymer separation membrane and the amount of the conductive polymer coated on the other surface of the porous polymer separation membrane.

Since the deposition of the conductive polymer by vapor-phase polymerization occurs on the one surface of the porous polymer separation membrane, it is expected that the conductive polymer layer will be formed primarily on the one surface of the porous polymer separation membrane. However, as described above, as the conductive polymer is infiltrated into the pores of the porous polymer separation membrane, some of the conductive polymer is also coated on the other surface of the porous polymer separation membrane via diffusion of the monomers through the pores.

Given the fact that some of the conductive polymer is coated also on the other surface of the porous polymer separation membrane, there should be some distance between the amount of the conductive polymer coated on the one surface of the porous polymer separation membrane and the amount of the conductive polymer coated on the other surface of the porous polymer separation membrane in order to ensure the optimum structural anisotropy for responsiveness to organic solvents.

In summary, the structural anisotropy of the porous polymer actuator according to the present disclosure is ensured by the gradient of the coating amount of the conductive polymer along pore depth formed by the infiltration coating of the conductive polymer in the pores of the porous polymer separation membrane during the vapor-phase polymerization process.

The difference in the conductive polymer coating amount between the one surface and the other surface of the porous polymer separation membrane may be defined by and quantified with the contents of elements contained in the conductive polymer. In the present disclosure, any of polypyrrole, PEDOT, P3HT, P3HP, polythiophene, and polyfuran may be used as the conductive polymer as described above, and the amount of elements contained in the conductive polymer is proportional to the coating amount of the conductive polymer.

Specifically, polypyrrole and P3HP contain nitrogen (N), and the nitrogen content of the conductive polymer is proportional to the coating amount of polypyrrole or P3HP. And, PEDOT, P3HT and polythiophene contain sulfur (S), and sulfur content is proportional to the coating amount thereof. In addition, polyfuran contains oxygen (O), and oxygen content is proportional to the coating amount of polyfuran.

Moreover, in the present disclosure, the structural anisotropy of the porous polymer actuator is quantified as follows based on the experimental result for polypyrrole used as the conductive polymer. When polypyrrole is used as the conductive polymer, the difference in the content of nitrogen contained in the conductive polymer on the one surface of the porous polymer separation membrane and the content of nitrogen contained in the conductive polymer on the other surface of the porous polymer separation membrane, i.e., the difference in nitrogen content, should be 2% or greater. The upper limit of the difference in nitrogen content is not limited because the structural anisotropy of the porous polymer actuator is improved as the nitrogen content is increased. In an experimental example of the present disclosure, polypyrrole the upper limit of the difference in nitrogen content was confirmed to be 7.5%.

The difference in nitrogen content is partly related with vapor-phase polymerization time. According to an experimental result described below, the difference in nitrogen content reached the maximum value of 7.5% when vapor-phase polymerization time was 60 minutes under a specific condition, and actuation response time and bending angle characteristics in response to organic solvents were the most superior when the difference in nitrogen content was 7.5%. When the difference in nitrogen content was smaller than 2%, the actuation response time in response to organic solvents was decreased and the bending angle of the polymer actuator was decreased remarkably. When the difference in nitrogen content was smaller than the maximum value (7.5%), the vapor-phase polymerization time was shorter than 60 minutes or longer than 60 minutes. The former case is the case where the absolute amount of the conductive polymer coated in the pores (i.e. pore walls) of the porous polymer separation membrane is small, and the latter case is the case where a large amount of the conductive polymer is coated also on the other surface of the porous polymer separation membrane. For both cases, the actuation response time and bending angle characteristics are not satisfactory because structural anisotropy is not ensured enough.

Since the conductive polymer layer is formed on the one surface of the porous polymer separation membrane by vapor-phase polymerization and only a slight amount of the conductive polymer layer is formed on the other surface, the one surface and the other surface of the porous polymer separation membrane have different mechanical properties. This serves as a factor that strengthens the bending angle characteristics during reversible shape change. According to an experimental result described below, hardness and elastic modulus increase linearly with vapor-phase polymerization time on the one surface of the porous polymer separation membrane on which the conductive polymer layer is deposited by vapor-phase polymerization. On the other hand, the hardness and elastic modulus are maintained almost constant on the other surface of the porous polymer separation membrane regardless of vapor-phase polymerization time.

The porous polymer actuator according to an exemplary embodiment of the present disclosure has been described above. Next, a method for fabricating the porous polymer actuator according to an exemplary embodiment of the present disclosure will be described.

As described above, the porous polymer actuator according to the present disclosure is prepared through vapor-phase polymerization process. Specifically, it is prepared through the following process.

Figure 2:
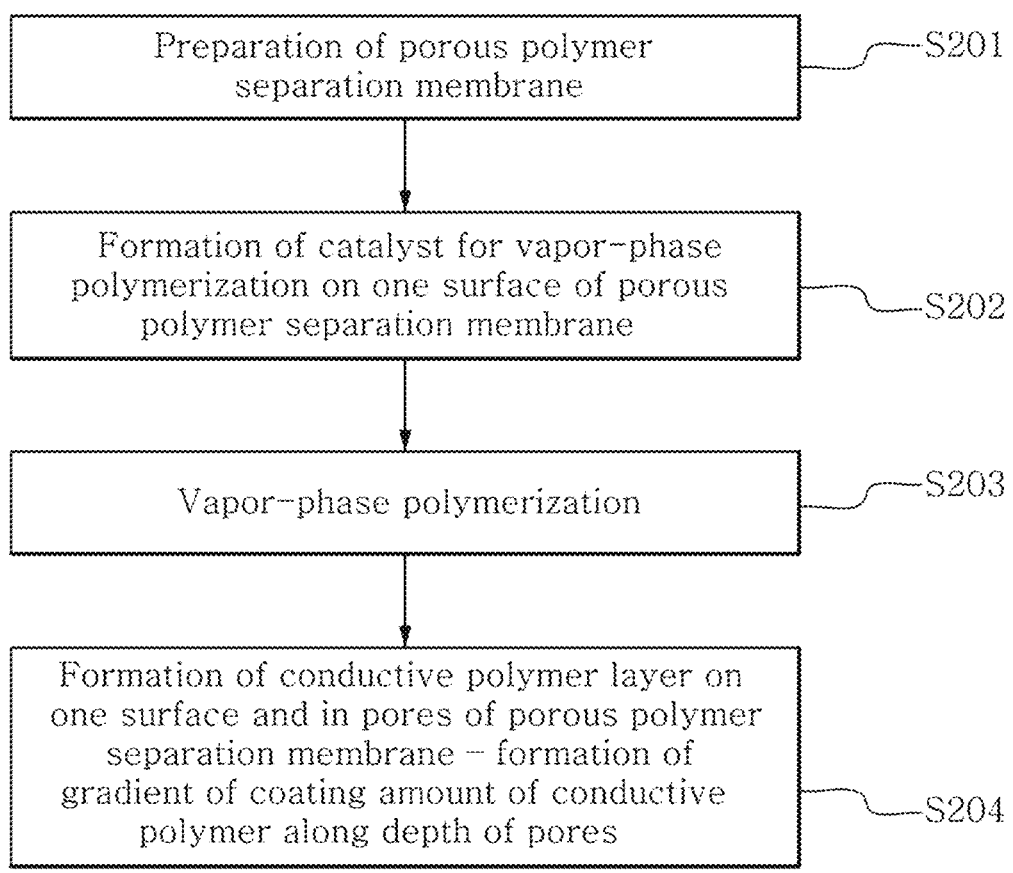
FIG. 2 is a flow chart for describing a method for fabricating a porous polymer actuator according to an exemplary embodiment of the present disclosure.

Referring to FIG. 2, a porous polymer separation membrane is prepared (S201).

The porous polymer separation membrane is a polymer separation membrane having a plurality of pores. The polymer separation membrane may be made of, for example, any of polyvinylidene fluoride (PVDF), polycarbonate (PC), polyimide (PI), nylon, and fluorodyne, although not being limited thereto. In addition, the porous polymer separation membrane may be a hydrophilic or hydrophobic porous polymer separation membrane because the surface property is not limited. As the porous polymer separation membrane, a commercially available porous polymer separation membrane may also be used.

Then, an oxidizing agent for vapor-phase polymerization is formed on one surface of the porous polymer separation membrane (S202).

The oxidizing agent for vapor-phase polymerization may be a trivalent iron salt or ammonium peroxydisulfate. The trivalent iron salt or ammonium peroxydisulfate formed on the one surface of the porous polymer separation membrane serves as an oxidizing agent during vapor-phase polymerization of a monomer into a conductive polymer.

In order to form the oxidizing agent for vapor-phase polymerization on the one surface of the porous polymer separation membrane, an oxidizing agent solution for vapor-phase polymerization is prepared and then it is coated on the one surface of the porous polymer separation membrane. Then, the oxidizing agent for vapor-phase polymerization is formed on the one surface of the porous polymer separation membrane if the porous polymer separation membrane coated with the oxidizing agent solution for vapor-phase polymerization is dried at room temperature in the air.

When the oxidizing agent for vapor-phase polymerization is a trivalent iron salt, a solution containing any of iron(III) chloride hexahydrate, iron(III) nitrate nonahydrate, iron(III) sulfate hydrate, and iron(III) p-toluenesulfonate hexahydrate may be used as the oxidizing agent solution for vapor-phase polymerization. When the oxidizing agent for vapor-phase polymerization is ammonium peroxydisulfate, an ammonium peroxydisulfate solution may be used as the oxidizing agent solution for vapor-phase polymerization. In addition, as a solvent of the oxidizing agent solution for vapor-phase polymerization, any of ethanol, acetonitrile, acetone, methanol, DMSO and DMF may be used. In addition, a solute content of the oxidizing agent solution for vapor-phase polymerization is 10-70 wt %. In an experimental example described below, a 30 wt % iron(III) chloride ethanol solution was used.

Meanwhile, it is necessary to limit the amount of the oxidizing agent solution for vapor-phase polymerization coated on the porous polymer separation membrane per unit area ($cm^2$) of the porous polymer separation membrane.

As described above, the oxidizing agent for vapor-phase polymerization formed on the porous polymer separation membrane by the oxidizing agent solution for vapor-phase polymerization functions as an oxidizing agent during the vapor-phase polymerization process of the monomer to the conductive polymer. If the amount of the oxidizing agent for vapor-phase polymerization is excessive, the pores of the porous polymer separation membrane may be blocked by the conductive polymer due to fast polymerization speed of the conductive polymer. On the contrary, if the concentration of the oxidizing agent for vapor-phase polymerization is low, the conductive polymer layer may not be formed on the one surface of the porous polymer separation membrane. Therefore, when a 30 wt % iron(III) chloride solution is used, it is preferred that 10-50 μL of the iron(III) chloride solution is coated per unit area ($cm^2$) of the porous polymer separation membrane.

After the oxidizing agent for vapor-phase polymerization is formed on the one surface of the porous polymer separation membrane, vapor-phase polymerization of the conductive polymer is conducted (S203).

After providing the porous polymer separation membrane with the oxidizing agent for vapor-phase polymerization formed in a chamber, a monomer solution is added dropwise on a region of the chamber where the porous polymer separation membrane is not located. The added monomer solution is vaporized and the monomer is polymerized into a conductive polymer by the oxidizing agent for vapor-phase polymerization provided on the one surface of the porous polymer separation membrane. The vaporization of the added monomer is performed at 15-80° C. As a result, a conductive polymer layer is formed on the one surface of the porous polymer separation membrane (S204). The conductive polymer formed by the vapor-phase polymerization is also infiltrated into the pores of the porous polymer separation membrane.

Any of pyrrole, 3,4-ethylenedioxythiophene (EDOT), 3-hexylthiophene (3HT), 3-heptylpyrrole (3HP), thiophene, and furan may be used as the monomer, and the conductive polymer produced by the vapor-phase polymerization of the monomer is any of polypyrrole (PPy), poly(3,4-ethylenedioxythiophene) (PEDOT), poly(3-hexylthiophene) (P3HT), poly(3-heptylpyrrole) (P3HP), polythiophene, and polyfuran.

A polymer actuator is completed as the conductive polymer layer is formed on the one surface of the porous polymer separation membrane by the vapor-phase polymerization process. Structural anisotropy is provided to the polymer actuator as the conductive polymer is infiltrated into the pores of the porous polymer separation membrane.

The conductive polymer formed by the vapor-phase polymerization is coated in the pores (i.e. pore walls) of the porous polymer separation membrane by diffusion of monomers. Because the vapor-phase polymerization reaction occurs primarily on the one surface of the porous polymer separation membrane, the conductive polymer is infiltrated only through the pores of the one surface of the porous polymer separation membrane. Accordingly, the amount of the conductive polymer coated in the pores (i.e. pore walls) has a gradient along the pore depth. More specifically, it has a gradient wherein the amount of the conductive polymer coated in the pores (i.e. pore walls) by the vapor-phase polymerization decreases from the one surface of the porous polymer separation membrane toward the other surface.

Since the deposition of the conductive polymer by the vapor-phase polymerization occurs on the one surface of the porous polymer separation membrane, the conductive polymer layer is formed only on the one surface of the porous polymer separation membrane. However, as described above, since the conductive polymer is infiltrated into the pores of the porous polymer separation membrane, some of the conductive polymer is coated in the pores (i.e. pore walls) and also is coated on the other surface of the porous polymer separation membrane by diffusion of monomers.

Therefore, the porous polymer actuator has structural anisotropy as the conductive polymer is infiltrated into the pores of the porous polymer separation membrane during the vapor-phase polymerization process.

The structural anisotropy achieved through the infiltration coating of the conductive polymer into the pores of the porous polymer separation membrane can be confirmed quantitatively. As described above, polypyrrole and P3HP contain nitrogen (N), and nitrogen content is proportional to the coating amount of polypyrrole or P3HP. Each of PEDOT, P3HT and polythiophene contains sulfur (S), and sulfur content is proportional to the coating amount thereof. Polyfuran contains oxygen (O), and oxygen content is proportional to the coating amount of polyfuran.

To take polypyrrole as an example, nitrogen content is increased in proportional to the coating amount of polypyrrole. Due to the gradient where the amount of polypyrrole coated in the pores (i.e. pore walls) decreases from the one surface of the porous polymer separation membrane toward the other surface, there exists difference in the nitrogen content on the one surface of the porous polymer separation membrane and the nitrogen content on the other surface of the porous polymer separation membrane. This difference proves the structural anisotropy of the porous polymer actuator.

In an experimental example of the present disclosure, it was confirmed that, when the conductive polymer is polypyrrole, the difference in nitrogen content on the one surface of the porous polymer separation membrane and nitrogen content on the other surface of the porous polymer separation membrane, i.e., 'the difference in nitrogen content', was up to 7.5%. Although the maximum value of 'the difference in nitrogen content' may be larger or smaller than 7.5% depending on experimental conditions, the structural anisotropy of the porous polymer actuator is ensured by 'the difference in nitrogen content' itself.

It was confirmed that structural anisotropy is provided to the porous polymer actuator by the infiltration coating of polypyrrole in the pores of the porous polymer separation membrane during the vapor-phase polymerization process. Based on the experimental result, it can be said that 'the difference in nitrogen content' of the porous polymer actuator according to the present disclosure is 2-7.5%'.

The difference in nitrogen content is partly related with vapor-phase polymerization time. According to an experimental result described below, the difference in nitrogen content was up to 7.5% under a specific condition when the vapor-phase polymerization time was 60 minutes, and the actuation response time and bending angle characteristics in response to organic solvents was the most superior when the difference in nitrogen content was 7.5%. When the difference in nitrogen content was smaller than 2%, the actuation response time in response to organic solvents was decreased and the bending angle of the polymer actuator was decreased remarkably. When the vapor-phase polymerization time was shorter than 60 minutes or longer than 60 minutes, the difference in nitrogen content was smaller than the maximum value (7.5%). The former case is the case where the absolute amount of the conductive polymer coated in the pores (i.e. pore walls) of the porous polymer separation membrane is small, and the latter case is the case where a large amount of the conductive polymer is coated also on the other surface of the porous polymer separation membrane. For both cases, the actuation response time and bending angle characteristics are not satisfactory because structural anisotropy is not ensured enough.

When preparing the porous polymer actuator according to an exemplary embodiment of the present disclosure, the conductive polymer layer formed on the one surface of the porous polymer separation membrane can be patterned selectively. Through the patterning of the conductive polymer layer, a region with the conductive polymer layer formed may be distinguished from a region with the conductive polymer layer not formed, and the regions may be utilized as a conductive region and a non-conductive region, respectively.

The patterning of the conductive polymer layer is performed as follows.

After the oxidizing agent for vapor-phase polymerization is formed on the porous polymer separation membrane, a mask is formed on a region of the porous polymer separation membrane, which corresponds to a non-conductive region. The mask may be formed by adding water drops dropwise or using a tape. If a vapor-phase polymerization process is performed in this state, the conductive polymer layer is not formed on the non-conductive region with the mask formed and, therefore, a conductive region and a non-conductive region may be formed distinctly on the porous polymer actuator.

The porous polymer actuator according to an exemplary embodiment of the present disclosure and the method for fabricating the same have been described above. Hereinafter, the present disclosure will be described more specifically through experimental examples.

Experimental Example 1: Fabrication of Porous Polymer Actuator

After coating 0.1 mL of a 30 wt % iron chloride ethanol solution on a PVDF membrane (1.5 cm×4 cm, pore size 0.45 µm), the membrane was dried for about 3 minutes in the air. The amount of the coated iron chloride solution was about 20 µL per unit area (cm$^2$) of the membrane. Because porosity and thickness vary depending on the type of membranes, the coating amount of the iron chloride solution per unit area (cm$^2$) of the membrane may be adjusted to 10-50 µL. The membrane dried in the air was transferred to a glass chamber and 20 µL of a pyrrole solution was added dropwise into the chamber. The amount of the pyrrole solution may be adjusted to 1-5 µL per unit area (cm$^2$) of the membrane. The vapor-phase polymerization time in the chamber was controlled to 3, 10, 30, 60 or 120 minutes. After the reaction, the membrane was washed several times with methanol in order to remove unreacted iron ions and pyrrole, and then the membrane was dried in vacuo.

In addition, vapor-phase polymerization of pyrrole was conducted after patterning the surface of the membrane. After masking the surface of the dried membrane with the iron chloride solution coated using water drops or a tape, a conductive polymer was formed except the masked region.

Experimental Example 2: Characteristics of Porous Polymer Actuator

The characteristics of the porous polymer actuator fabricated in Experimental Example 1 were analyzed.

Figure 3:
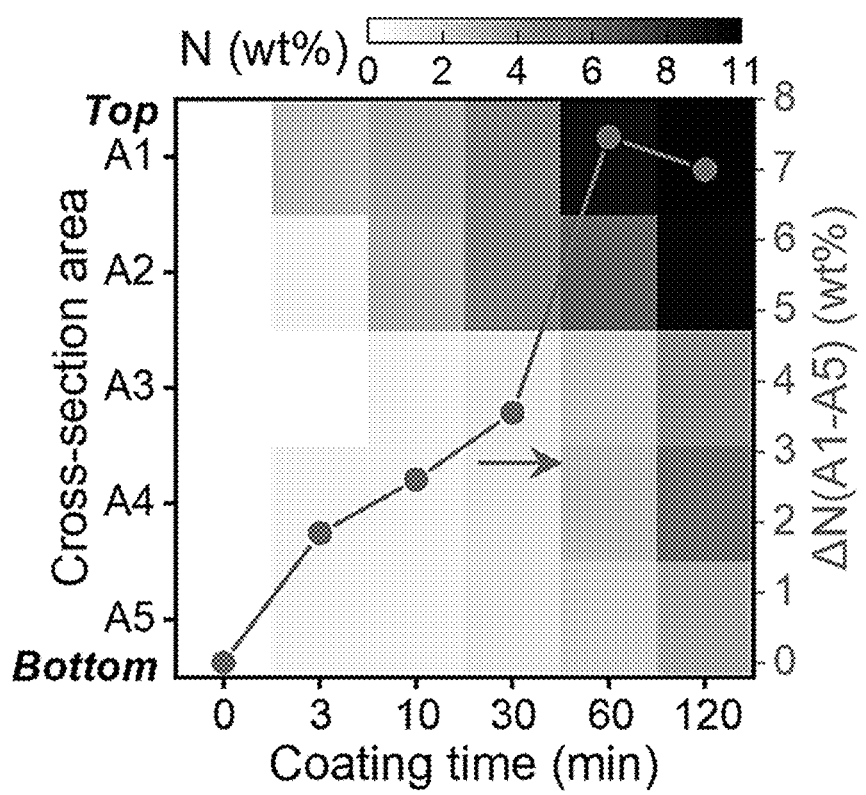
FIG. 3 shows the change in nitrogen content of the cross-section of a porous polymer separation membrane depending on vapor-phase polymerization time and the difference in nitrogen content between one surface and the other surface of the separation membrane.

FIG. 3 shows the change in nitrogen content of the cross-section of the porous polymer separation membrane depending on vapor-phase polymerization time and the difference in nitrogen content between one surface and the other surface of the separation membrane. Referring to the EDX analysis result of FIG. 3, the nitrogen content on one surface of the porous polymer separation membrane is about 3% when the vapor-phase polymerization time is shorter than 10 minutes, and is increased to 4.7% at 30 minutes, 9.5% at 60 minutes, and 10.5% at 120 minutes. The one surface of the separation membrane refers to the surface on which the conductive polymer is deposited directly by vapor-phase polymerization, and the other surface refers to the surface opposite to the one surface.

Meanwhile, the difference in nitrogen content the one surface and the other surface of the separation membrane (solid line in FIG. 3), increases as the vapor-phase polymerization time increases to 60 minutes but decreases when the vapor-phase polymerization time is 120 minutes as compared to that at 60 minutes. The difference in nitrogen content was about 2% when the vapor-phase polymerization time was 3 minutes, about 2.7% at 10 minutes, and 3.5% at 30 minutes.

It is thought that the decrease of the difference in nitrogen content when the vapor-phase polymerization time was 120 minutes as compared to that at 60 minutes is due to the increased amount of the conductive polymer coated on the other surface of the separation membrane owing to the diffusion of the conductive polymer through the pores of the porous polymer separation membrane.

The difference in nitrogen content is directly related with the actuation response time and bending angle characteristics of the porous polymer actuator. The actuation response time and bending angle characteristics of the porous polymer actuator are improved as the difference in nitrogen content is larger.

Figure 4:
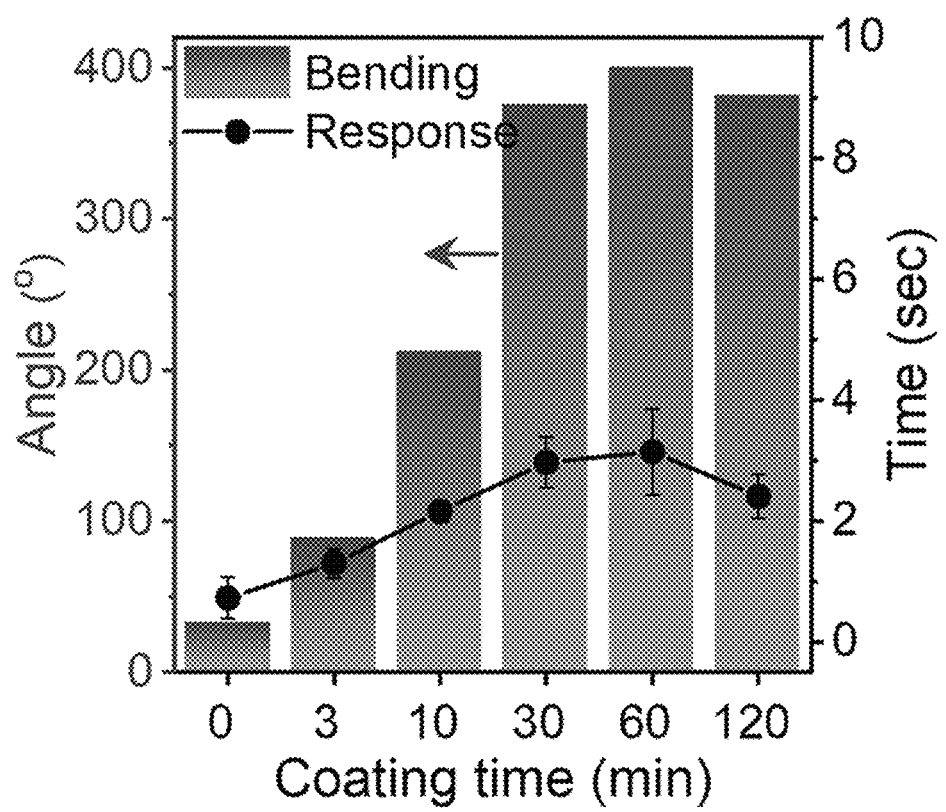
FIG. 4 shows the actuation response time and bending angle characteristics of a porous polymer actuator in response to acetone vapor depending on vapor-phase polymerization time.
Figure 5:
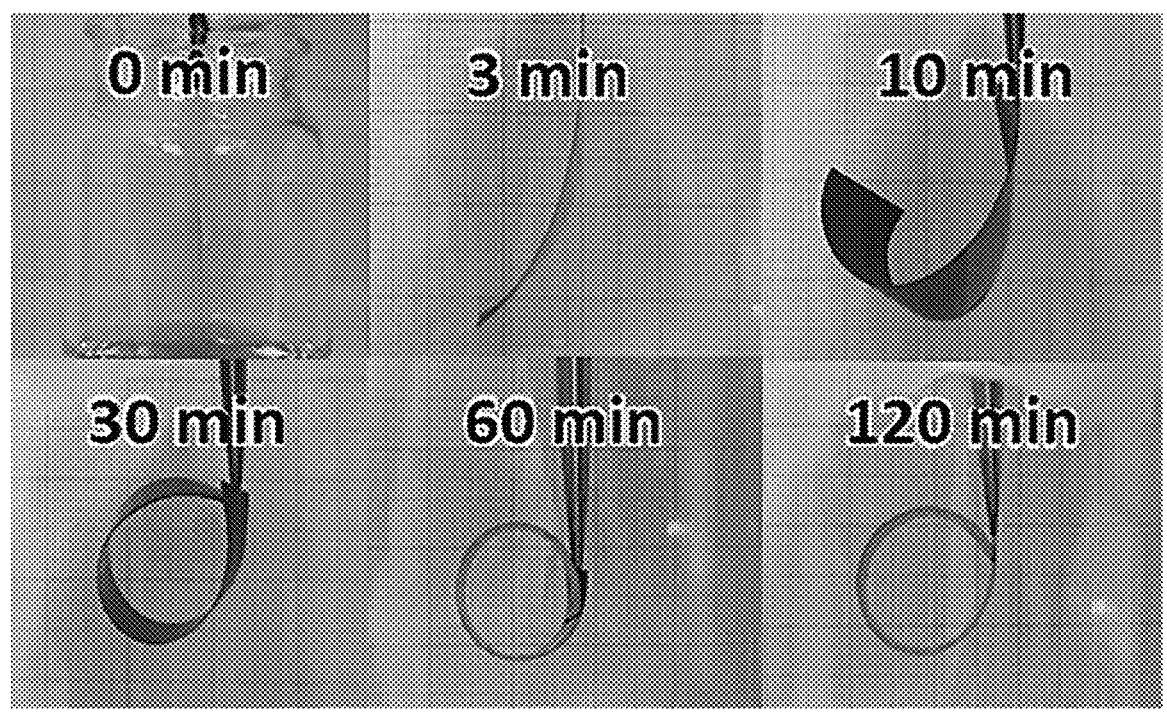
FIG. 5 shows photographs showing the reaction between a porous polymer actuator and acetone vapor depending on vapor-phase polymerization time.

Referring to FIG. 4, which shows the actuation response time and bending angle characteristics of the porous polymer actuator in response to acetone vapor depending on vapor-phase polymerization time, it can be seen that the actuation response time (3.1 seconds) and bending angle (400.03°, corresponding to a curvature of 1.74 cm$^{-1}$) characteristics of the porous polymer actuator were the most superior when the vapor-phase polymerization time was 60 minutes at which the difference in nitrogen content was maximum (7.5%). In addition, it can be seen that the actuation response time and bending angle characteristics decline gradually as the vapor-phase polymerization time is shorter than 60 minutes. Furthermore, when the vapor-phase polymerization time was 120 minutes, the actuation response time and bending angle characteristics were not so good as compared to when the vapor-phase polymerization time was 60 minutes because the difference in nitrogen content was decreased. FIG. 5 shows photographs showing the reaction between the porous polymer actuator and acetone vapor depending on vapor-phase polymerization time when the conductive polymer was polypyrrole.

Figure 14:
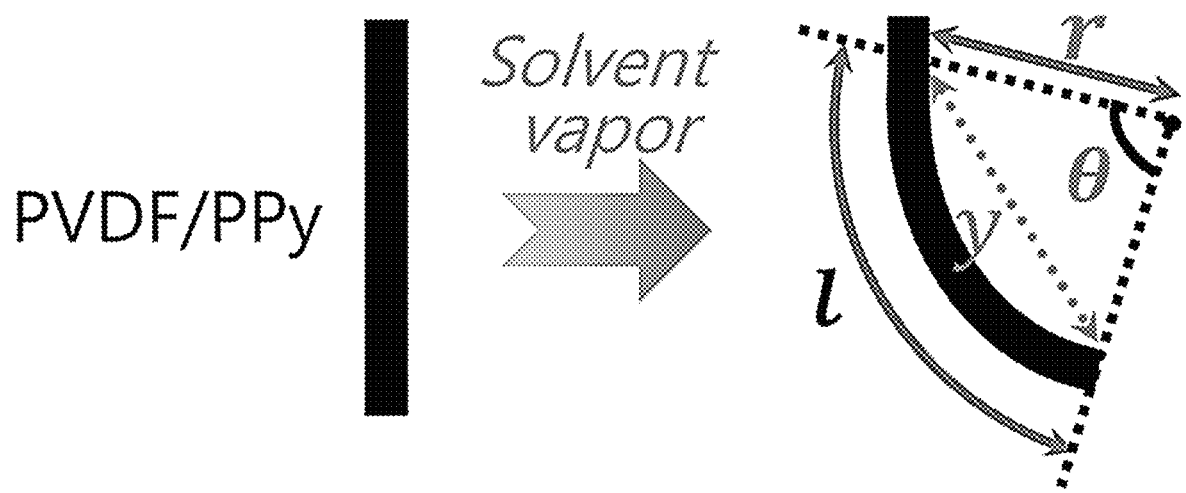
FIG. 14 is a reference diagram for describing a method for measuring the bending angle of a porous polymer actuator.

The bending angle in FIG. 4 was calculated according to Equations 1-3 (see FIG. 14). For a porous polymer actuator with a length (l), a radius (r) with respect to a bending angle (θ) has the relationship of Equation 1. The bending angle (θ) may be calculated from Equation 2 after measuring the chord (y) of the bent actuator, and the radius (r) calculated from Equation 1. The curvature is defined as the reciprocal of the radius (r), as shown in Equation 3.

$$l = r\theta, r = \frac{l}{\theta}. \quad \text{(Equation 1)}$$

$$y = 2r\sin\left(\frac{\theta}{2}\right) = \frac{2l}{\theta}\sin\left(\frac{\theta}{2}\right) \quad \text{(Equation 2)}$$

$$\text{curvature} = \frac{1}{r}. \quad \text{(Equation 3)}$$

Figure 6:
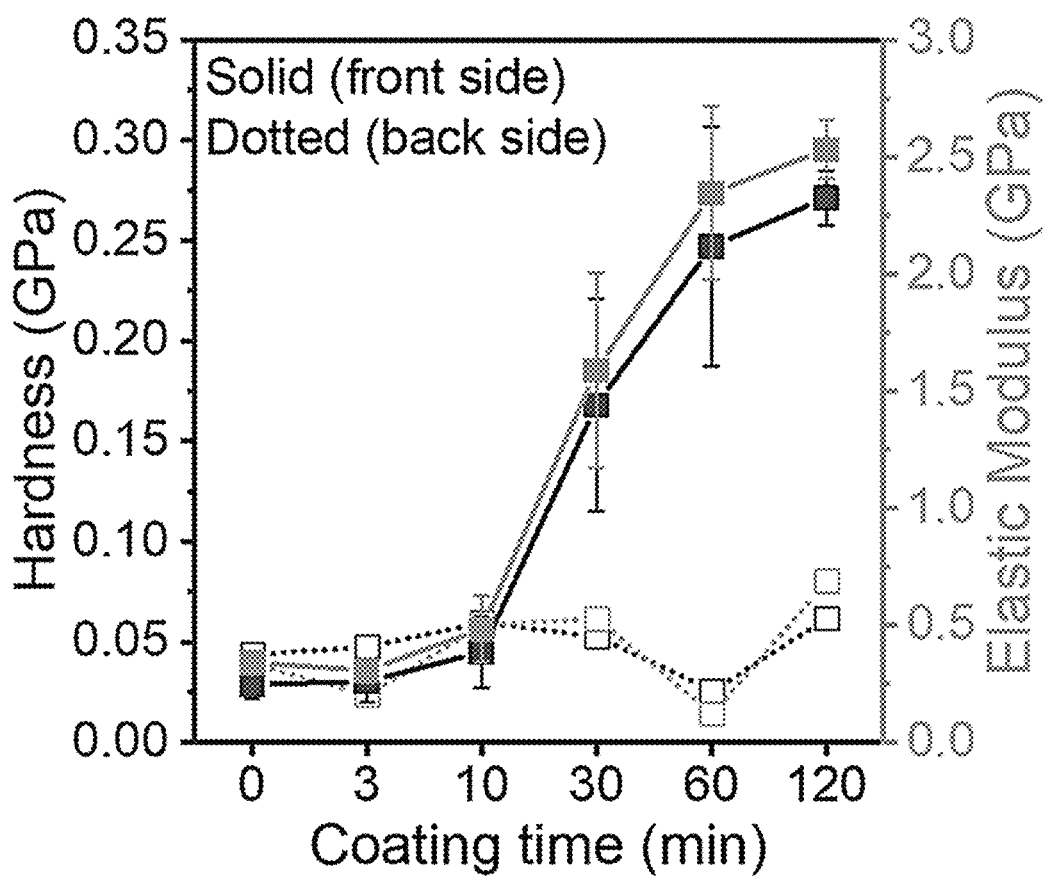
FIG. 6 shows the hardness and elastic modulus of one surface and the other surface of a porous polymer separation membrane depending on vapor-phase polymerization time.

FIG. 6 shows the hardness and elastic modulus of the one surface and the other surface of the porous polymer separation membrane depending on vapor-phase polymerization time when the conductive polymer was polypyrrole. As shown in FIG. 6, it can be seen that the hardness and elastic modulus increase linearly with vapor-phase polymerization time for the one surface of the separation membrane (solid lines). In contrast, for the other surface of the separation membrane, there was little change in hardness and elastic modulus regardless of vapor-phase polymerization time due to the small coating amount of the conductive polymer (dotted lines).

Figure 7:
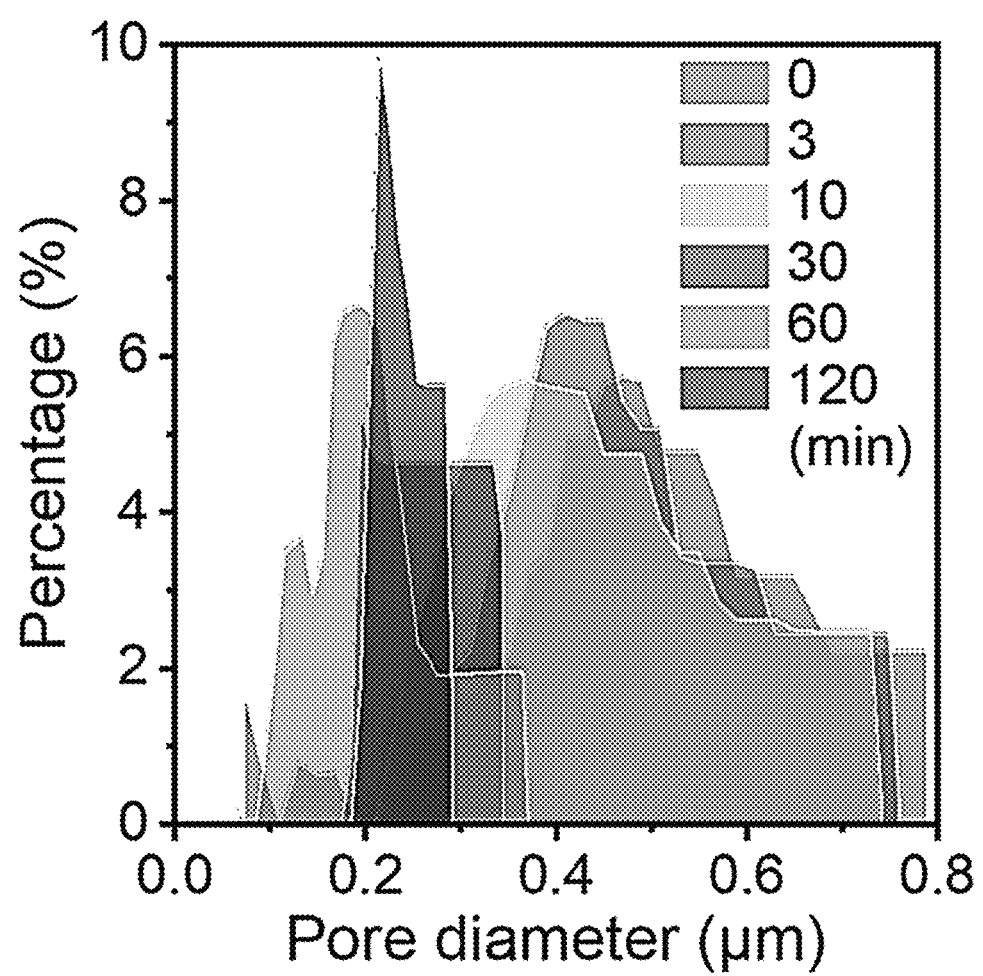
FIG. 7 shows the change in the pore size of a separation membrane depending on vapor-phase polymerization time.

FIG. 7 shows the change in the pore size of the separation membrane depending on vapor-phase polymerization time when the conductive polymer was polypyrrole. Referring to FIG. 7, it can be seen that the pore size decreases as the vapor-phase polymerization time is increased. This result suggests the increase in the amount of the conductive polymer coated in the pores (i.e. pore walls).

Next, the characteristics of the porous polymer actuator in response to various organic solvents were investigated. FIG.

Figure 8:
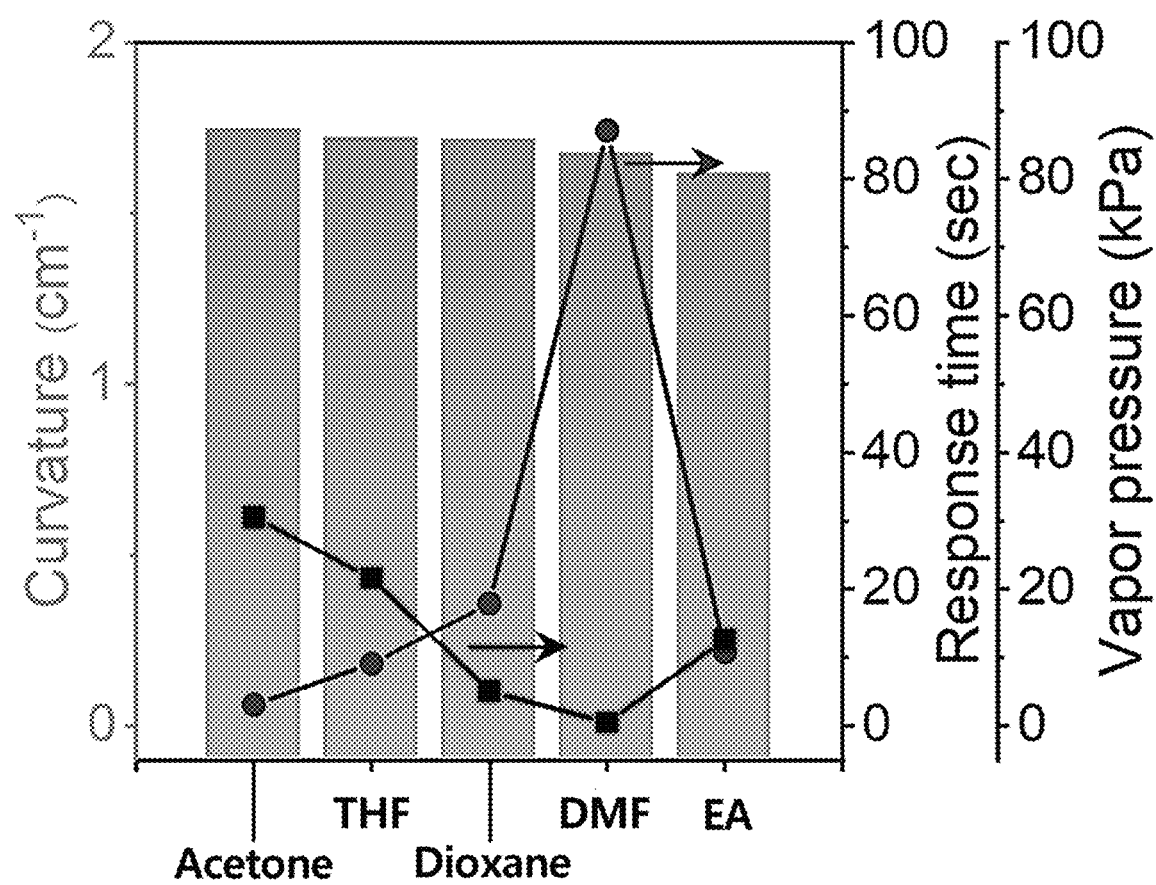
FIG. 8 shows the curvature characteristics of a porous polymer actuator for various organic solvent vapors and actuation response time depending on vapor pressure.
Figure 9:
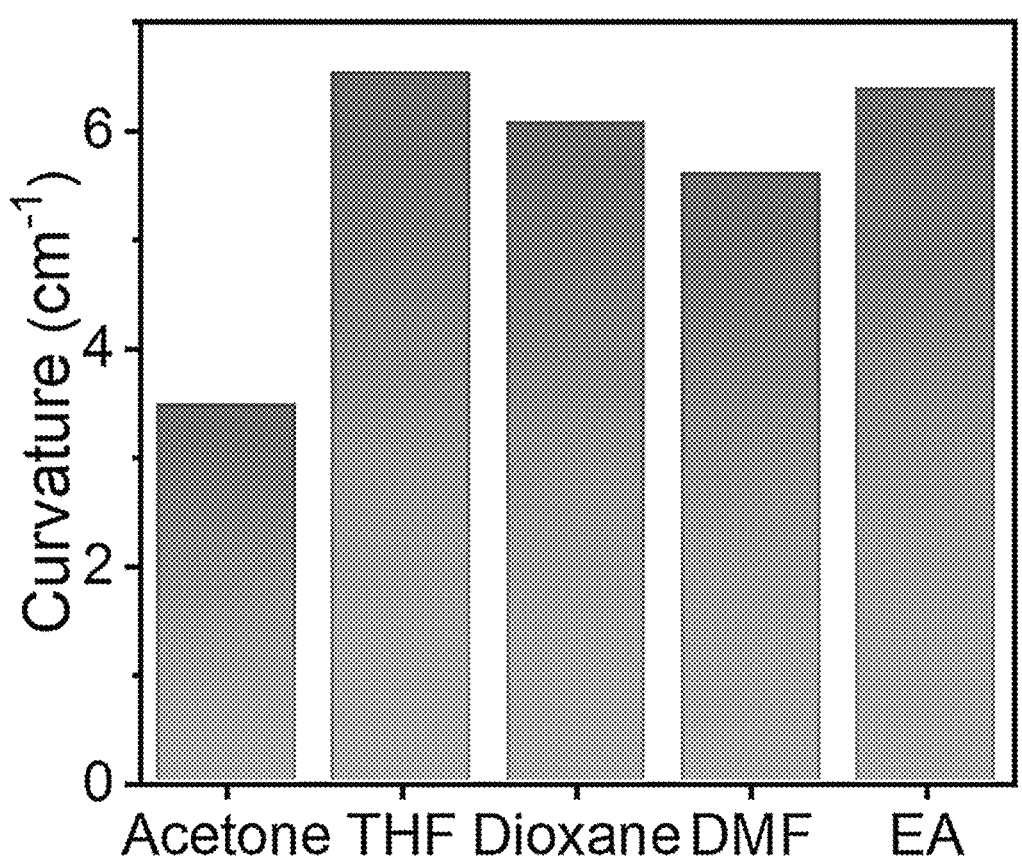
FIG. 9 shows the curvature characteristics of a porous polymer actuator for various liquid organic solvents.

8 shows the curvature characteristics of the porous polymer actuator for various organic solvent vapors and actuation response time depending on vapor pressure, and FIG. 9 shows the curvature characteristics of the porous polymer actuator in liquid organic solvents when the conductive polymer was polypyrrole. The porous polymer actuator used in FIG. 8, FIG. 9 and FIGS. 10-12 was prepared by conducting vapor-phase polymerization for 60 minutes.

Referring to FIG. 8, it can be seen that the change in curvature of the porous polymer actuator in response to the vapor of acetone, THF, Dioxane, DMF or ethyl acetate (EA) was superior as 1.6 cm$^{-1}$ or larger. Referring to FIG. 8, the actuation response time was inversely proportional to the vapor pressure of the organic solvent. In contrast, the vapor pressure of the organic solvent had almost no effect on the curvature characteristics of the porous polymer actuator in liquid organic solvents as displayed in FIG. 9.

Figure 10:
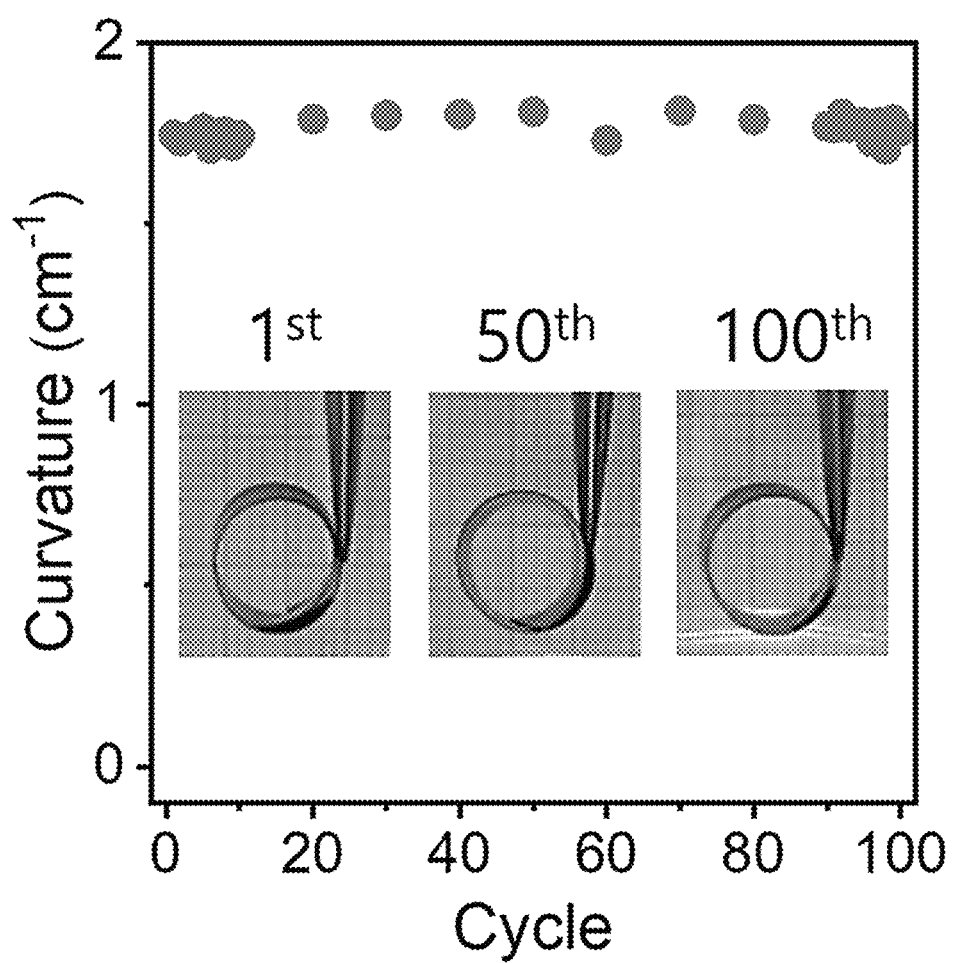
FIG. 10 shows the change in the curvature of a porous polymer actuator depending on the number of exposure to acetone vapor.

FIG. 10 shows the change in the curvature of the porous polymer actuator depending on the number of exposure to acetone vapor when the conductive polymer was polypyrrole. As shown in FIG. 10, the curvature characteristics were similar when the number of exposure was 1, 50 or 100. This shows that the reversible shape change characteristics of the porous polymer actuator according to the present disclosure in response to organic solvents are maintained even after long-term use.

Figure 11:
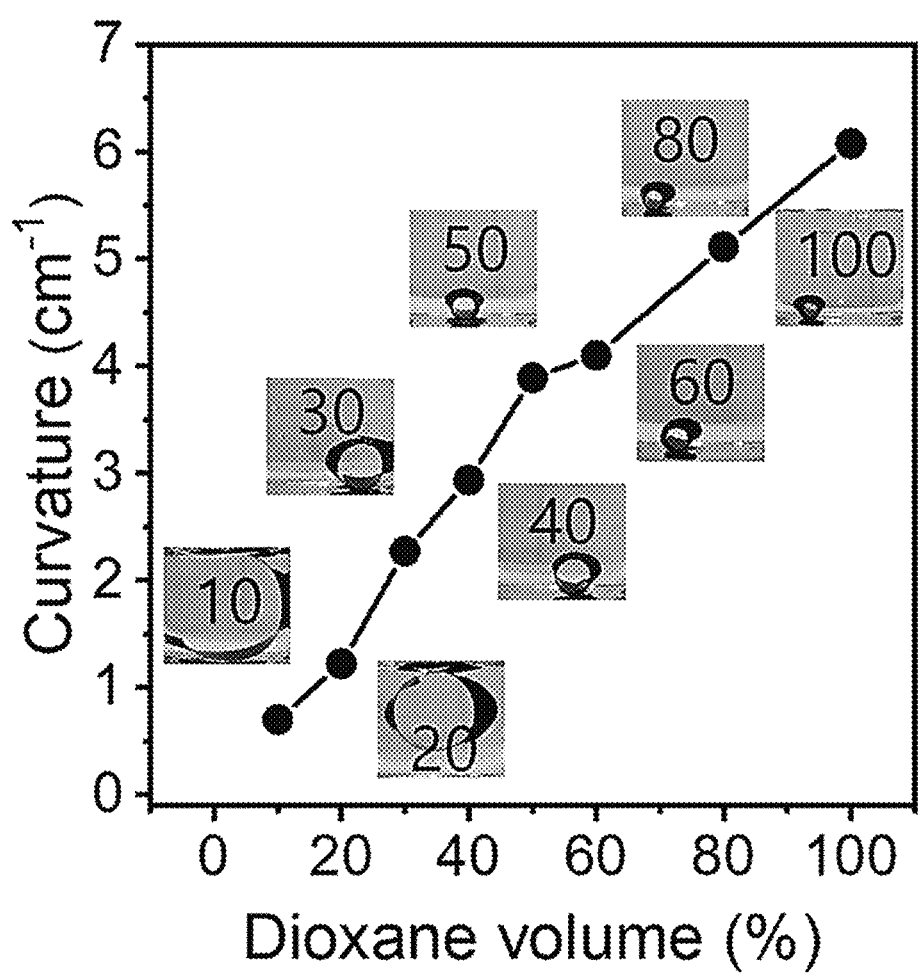
FIG. 11 shows the change in the curvature of a porous polymer actuator in a mixture solution of dioxane and water.

FIG. 11 shows the change in the curvature of the porous polymer actuator in a mixture solution of dioxane and water when the conductive polymer was polypyrrole. Referring to FIG. 11, it can be seen that the curvature decreases as the proportion of dioxane decreases in the mixture of dioxane and water. It is because the porous polymer actuator does not react with water.

Figure 12:
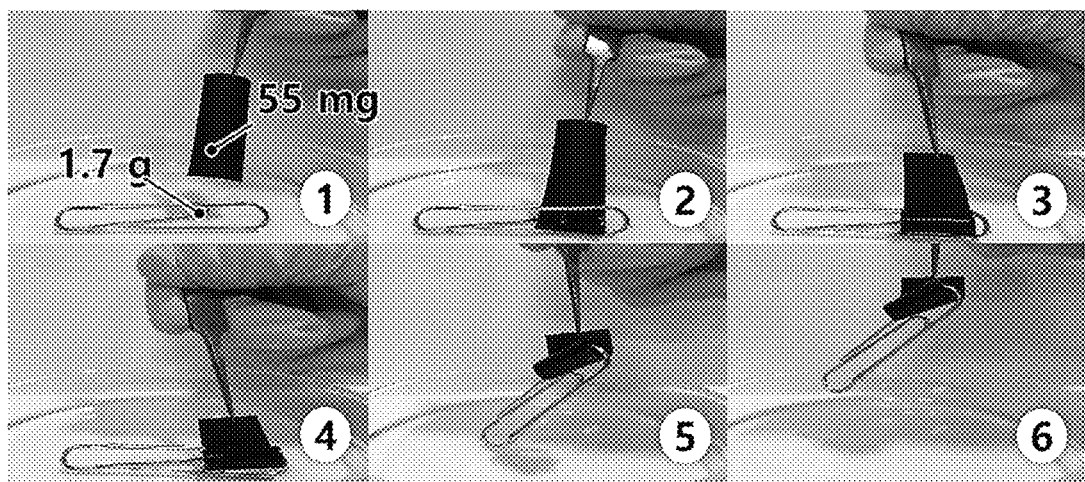
FIG. 12 shows the lifting of a metal clip by the bending characteristics of a porous polymer actuator in a mixture solution of dioxane and water.

FIG. 12 shows the lifting of a metal clip by the bending characteristics of the porous polymer actuator in a mixture solution of dioxane and water when the conductive polymer was polypyrrole. As shown in FIG. 12, the porous polymer actuator (55 mg) could easily lift the metal clip (1.7 g) which was heavier about 31 times or more.

Figure 13:
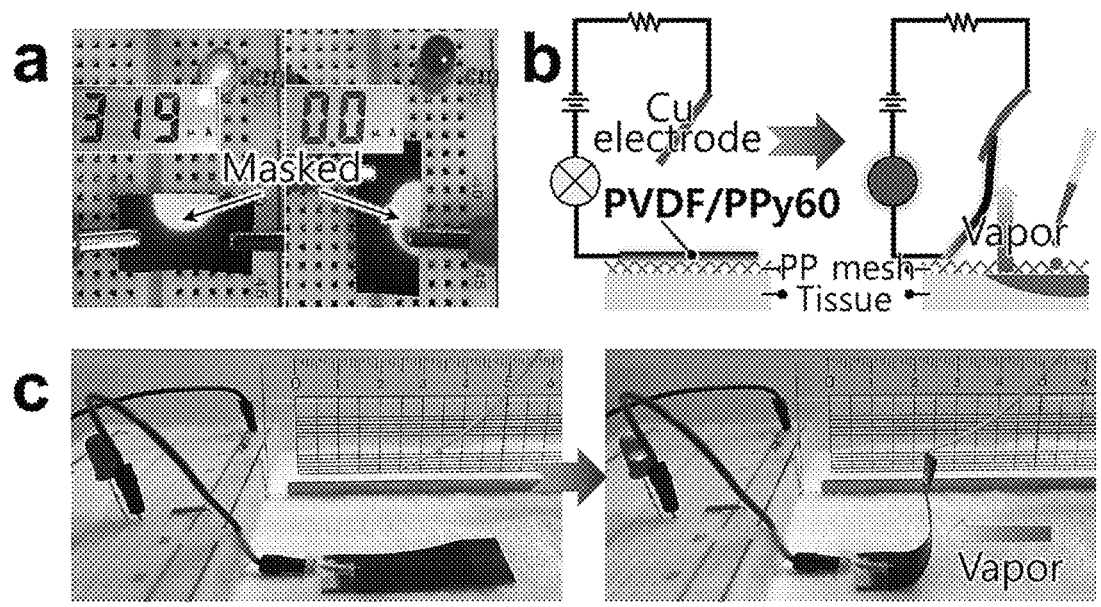
FIG. 13 shows the schematic diagram and photographs of a porous polymer actuator patterned by a mask to have a conductive region and a non-conductive region.

FIG. 13 shows the schematic diagram and photographs of the porous polymer actuator patterned to have a conductive region and a non-conductive region when the conductive polymer was polypyrrole. In FIG. 13, the black portion of the porous polymer actuator in 'a' is a conductive region, and the white portion is a non-conductive region. When electric power was applied to the conductive region, a current of 319 μA was measured. In contrast, no current was measured when electric power was applied to the non-conductive region. This result proves that selective patterning of the porous polymer actuator is possible. FIG. 13 'b' schematically shows that, when the porous polymer actuator is exposed to an organic solvent in vapor phase, the porous polymer actuator may be connected to a conducting wire owing to the bending motion of the porous polymer actuator. FIG. 13 'c' shows that, as a result of the bending motion of the porous polymer actuator in the response to organic solvent vapor, the porous polymer actuator is bent to close the electric circuit and an LED is turned on.

The invention claimed is:

1. A porous polymer actuator comprising:
a porous polymer separation membrane having pores; and
a conductive polymer layer coated on one surface and in the pores of the porous polymer separation membrane, wherein the porous polymer actuator has a gradient wherein the amount of the conductive polymer coated in the pores decreases from the one surface of the porous polymer separation membrane toward the other surface.

2. The porous polymer actuator according to claim 1, which has, due to the gradient wherein the amount of the conductive polymer coated in the pores decreases from the one surface of the porous polymer separation membrane toward the other surface, a gradient wherein volume expansivity decreases from the one surface of the porous polymer separation membrane toward the other surface upon contact of the porous polymer actuator with an organic solvent.

3. The porous polymer actuator according to claim 2, wherein the organic solvent is a liquid organic solvent or an organic solvent vapor.

4. The porous polymer actuator according to claim 1, wherein
a conductive polymer is coated partly also on the other surface of the porous polymer separation membrane, and
the porous polymer actuator has a gradient wherein the content of a specific element comprised in the conductive polymer decreases from the one surface of the porous polymer separation membrane toward the other surface.

5. The porous polymer actuator according to claim 4, which has, if the conductive polymer is polypyrrole or poly(3-heptylpyrrole) (P3HP), a gradient wherein the content of nitrogen (N) comprised in the conductive polymer decreases from the one surface of the porous polymer separation membrane toward the other surface.

6. The porous polymer actuator according to claim 4, which has, if the conductive polymer is any of poly(3,4-ethylenedioxythiophene) (PEDOT), poly(3-hexylthiophene) (P3HT) and polythiophene, a gradient wherein the content of sulfur (S) comprised in the conductive polymer decreases from the one surface of the porous polymer separation membrane toward the other surface.

7. The porous polymer actuator according to claim 4, which has, if the conductive polymer is polyfuran, a gradient wherein the content of oxygen (O) comprised in the conductive polymer decreases from the one surface of the porous polymer separation membrane toward the other surface.

8. The porous polymer actuator according to claim 4, wherein if the conductive polymer is polypyrrole, the porous polymer actuator has a gradient wherein the content of nitrogen (N) contained in the conductive polymer decreases from the one surface of the porous polymer separation membrane toward the other surface, and the difference in nitrogen content between the one surface and the other surface of the porous polymer separation membrane is 2% or greater.

9. The porous polymer actuator according to claim 1, wherein the porous polymer separation membrane is made of any of polyvinylidene fluoride (PVDF), polycarbonate (PC), polyimide (PI), nylon, and fluorodyne.

10. The porous polymer actuator according to claim 1, wherein the conductive polymer is any of polypyrrole (PPy), poly(3,4-ethylenedioxythiophene) (PEDOT), poly(3-hexylthiophene) (P3HT), poly(3-heptylpyrrole) (P3HP), polythiophene, and polyfuran.

11. A method for fabricating a porous polymer actuator, comprising:
a step of preparing a porous polymer separation membrane having pores;

a step of forming an oxidizing agent for vapor-phase polymerization on one surface of the porous polymer separation membrane; and a step of forming a conductive polymer layer on the one surface and in the pores of the porous polymer separation membrane through vapor-phase polymerization, wherein the porous polymer actuator has a gradient wherein the amount of the conductive polymer coated in the pores decreases from the one surface of the porous polymer separation membrane toward the other surface.

12. The method for fabricating a porous polymer actuator according to claim 11, wherein, in the step of forming the conductive polymer layer on the one surface and in the pores of the porous polymer separation membrane through vapor-phase polymerization, the conductive polymer formed by vapor-phase polymerization is coated in the pores of the porous polymer separation membrane by diffusion of monomers and also is partly coated on the other surface of the porous polymer separation membrane, and the porous polymer actuator has a gradient wherein the content of a specific element comprised in the conductive polymer decreases from the one surface of the porous polymer separation membrane toward the other surface.

13. The method for fabricating a porous polymer actuator according to claim 11, wherein the porous polymer separation membrane is made of any of polyvinylidene fluoride (PVDF), polycarbonate (PC), polyimide (PI), nylon, and fluorodyne.

14. The method for fabricating a porous polymer actuator according to claim 11, wherein the step of forming the conductive polymer layer on the one surface and in the pores of the porous polymer separation membrane through vapor-phase polymerization comprises:

a process wherein the porous polymer separation membrane with the oxidizing agent for vapor-phase polymerization is provided in a chamber, a process wherein a monomer solution is added dropwise on a region of the chamber where the porous polymer separation membrane is not located, and a process wherein the added monomer solution is vaporized and the monomer is polymerized into a conductive polymer by the oxidizing agent for vapor-phase polymerization by diffusion of the monomers on the one surface of the porous polymer separation membrane.

15. The method for fabricating a porous polymer actuator according to claim 14, wherein the monomer is any of pyrrole, 3,4-ethylenedioxythiophene (EDOT), 3-hexylthiophene (3HT), 3-heptylpyrrole (3HP), thiophene, and furan, and the conductive polymer is any of polypyrrole (PPy), poly(3,4-ethylenedioxythiophene) (PEDOT), poly(3-hexylthiophene) (P3HT), poly(3-heptylpyrrole) (P3HP), polythiophene, and polyfuran.

16. The method for fabricating a porous polymer actuator according to claim 11, wherein the oxidizing agent for vapor-phase polymerization is a trivalent iron salt or ammonium peroxydisulfate.

17. The method for fabricating a porous polymer actuator according to claim 11, wherein the step of forming the oxidizing agent for vapor-phase polymerization on the one surface of the porous polymer separation membrane comprises:

a process wherein an oxidizing agent solution for vapor-phase polymerization is coated on the one surface of the porous polymer separation membrane, and a process wherein the porous polymer separation membrane coated with the oxidizing agent solution for vapor-phase polymerization is dried, wherein a solute content of the oxidizing agent solution for vapor-phase polymerization is 10-70 wt %.

18. The method for fabricating a porous polymer actuator according to claim 11, wherein the step of forming the oxidizing agent for vapor-phase polymerization on the one surface of the porous polymer separation membrane comprises:

a process wherein an oxidizing agent solution for vapor-phase polymerization is coated on the one surface of the porous polymer separation membrane, and a process wherein the porous polymer separation membrane coated with the oxidizing agent solution for vapor-phase polymerization is dried, wherein 10-50 µL of the oxidizing agent solution for vapor-phase polymerization is coated per unit area ($cm^2$) of the porous polymer separation membrane.

19. The method for fabricating a porous polymer actuator according to claim 11, which comprises, prior to the step of forming the conductive polymer layer on the one surface and in the pores of the porous polymer separation membrane through vapor-phase polymerization, a step of forming a mask on a portion of the one surface of the porous polymer separation membrane with the oxidizing agent for vapor-phase polymerization formed, wherein the conductive polymer layer is formed on the remaining region except the region on which the mask has been formed.

20. The method for fabricating a porous polymer actuator according to claim 19, wherein the mask is formed by adding water drops dropwise or providing a tape on the portion.

* * * * *